Jan. 8, 1946.  W. E. SWIFT, JR  2,392,428
COMBINED PERISCOPETELESCOPE
Filed Sept. 19, 1944  2 Sheets-Sheet 1
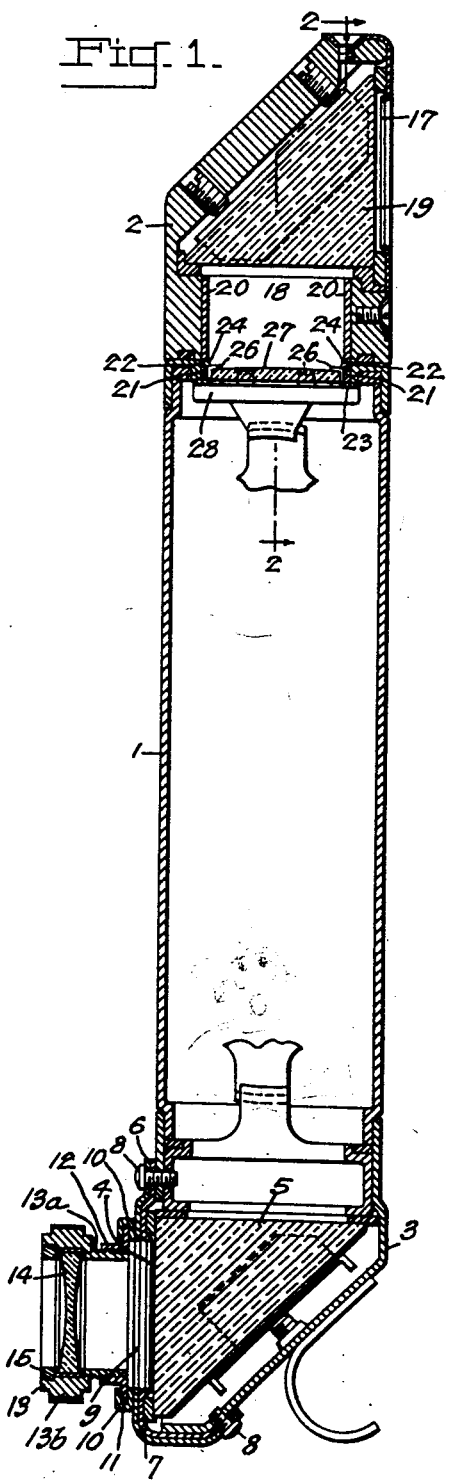
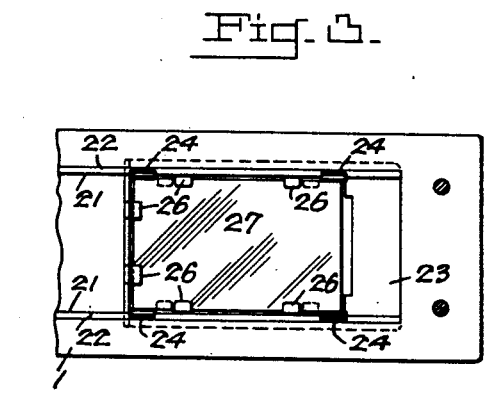
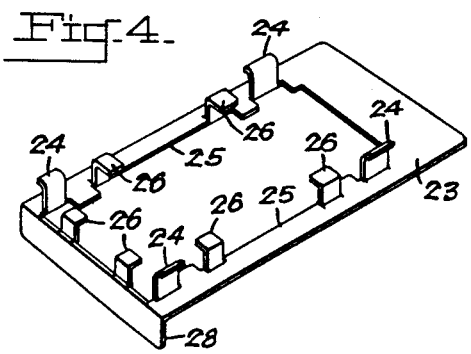
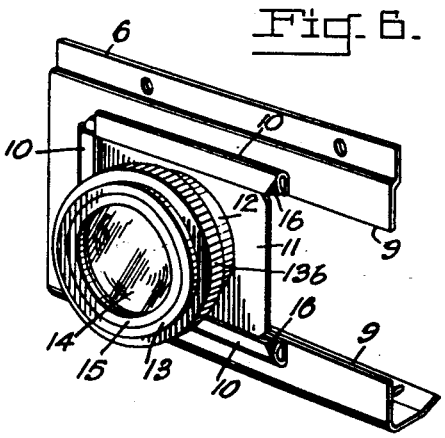
Inventor
Willard E. Swift, Jr.

Jan. 8, 1946. W. E. SWIFT, JR 2,392,428
COMBINED PERISCOPETELESCOPE
Filed Sept. 19, 1944 2 Sheets-Sheet 2
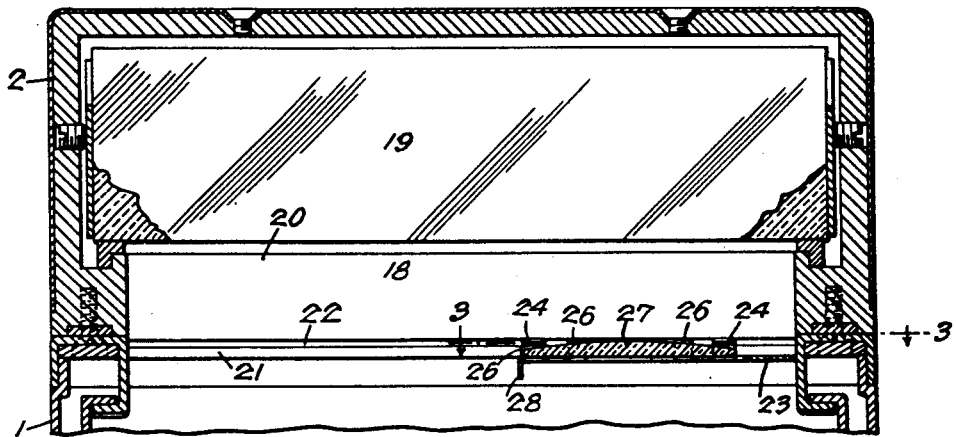
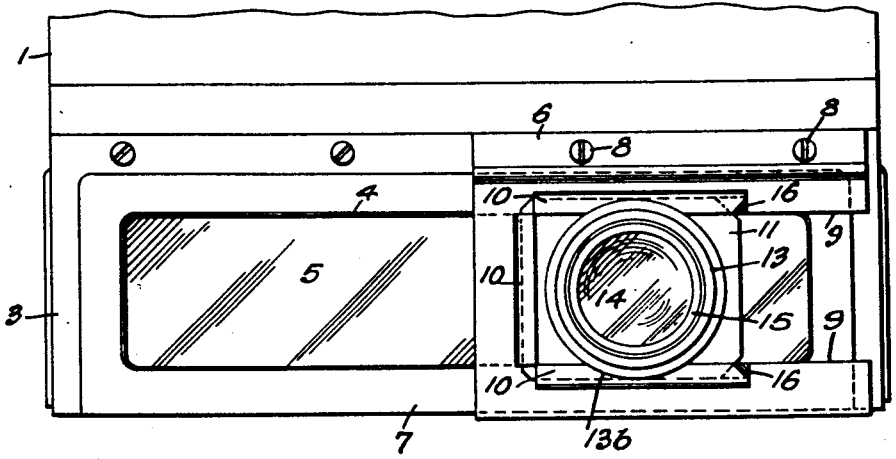
Inventor
Willard E. Swift, Jr.
By C. E. Herrstrom & H. E. Thibodeau
Attorneys Patented Jan. 8, 1946

2,392,428

UNITED STATES PATENT OFFICE 2,392,428

COMBINED PERISCOPE-TELESCOPE

Willard E. Swift, Jr., Worcester, Mass.

Application September 19, 1944, Serial No. 554,830

10 Claims. (Cl. 88—72)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel telescope attachment for periscopes. Hitherto it has been the practice to incorporate a complete telescope, with its housing and lenses, in the periscope.

The object of the present invention is to provide a simpler and less expensive means of incorporating the telescope in the periscope. The invention dispenses with the telescope tube or housing and requires only the application of the lenses to the upper and lower windows of the periscope. The lenses are mounted in simple carriers or holders which are easily and conveniently attached over corresponding areas of the windows. The carriers or holders are readily replaced in case the lenses are damaged.

An illustrative embodiment of the invention is disclosed in the following description and in the accompanying drawings in which:

Figure 1 is a vertical cross-sectional view of my novel invention;

Figure 2 is a fragmentary view taken on the line 2—2 of Figure 1;

Figure 3 is a fragmentary view taken on the line 3—3 of Figure 2;

Figure 4 is a perspective view of a lens supporting frame of my novel invention;

Figure 5 is a fragmentary front elevational view of the lower portion of my invention, and Figure 6 is a perspective view of the lens having supporting means therefor of my novel invention.

In Figure 1 is shown a periscope of well known design for military use, such as a periscope of the general type disclosed in the patent to Crawford, No. 2,307,759, granted January 12, 1943. In the illustrated embodiment the periscope comprises a body 1, a detachable head 2 at the upper end and an elbow 3 at the lower end. In the vertical wall of the elbow is formed an opening 4 against which is placed a prism 5.

Against a portion of the opening 4 is applied a lens carrier comprising a metal plate 6 attached to the frame portion 7 of the opening 4 by screws 8. The plate has a rectangular recess 9 extending from one of its edges, and the three edges of the recess are provided with channels 10. A plate 11 has an internally threaded centrally disposed annular flange 12 for engaging the threaded portion 13a of a cylindrical lens holder 13. A raised knurled portion 13b on the lens holder 13 permits rotation thereof for focusing without slippage of the fingers thereon. A negative or diverging lens 14 is secured in the lens holder 13 by a threaded locking member 15. The edges of the plate 11 slide in the channels 10 and are held therein by crimping the corners 16 of the channels 10.

The head 2 is formed with vertical and horizontal openings 17 and 18 respectively and contains a prism 19 as well known in the art. The horizontal opening is lined with a metal plate 20 and is fitted with a narrow strip 21 along both lower longitudinal edges to form parallel cracks or grooves 22.

The grooves 22 serve to support a lens mounting or frame 23 preferably of rectangular configuration. A suitable number of tongues 24 extend from parallel edges of the frame opening 25 and are bent slightly outward and so spaced as to snap into the parallel grooves 22. Angular lugs 26 are formed at the same edges and one of the intervening edges of the frame opening, on the same surface as the tongues 24, to engage one of the surfaces of a positive or converging lens 27. The last named intervening edge is flanged at 28 in the opposite direction to serve as a finger piece in adjusting the lens mounting. The latter is positioned to bring the lens 27 into proper alignment with the negative lens 14.

It is now evident that the periscope is thus equipped with a Galilean telescope in a comparatively simple manner. No additional tube or housing structure is required as in prior devices. The lens frames are relatively simple in design and inexpensive. The lenses need only be inserted therein.

It will be seen that prisms 19 and 5 constitute upper and lower reflecting members, respectively, in a wide angle periscope of the type adapted for observing the horizon. The negative and positive lenses 14 and 27, respectively, and their optical path constitute a magnifying optical system which is incorporated in the wide angle periscope.

The positive lens of the magnifying optical system is disposed in detachable head 2 substantially at the upper end of the body 1 and is securely held in this position by the abutting relationship between the longitudinal marginal edge portion of frame 23 and the superposed downwardly facing portion of narrow strip 21, while the tongues or tabs 24 extend upwardly and outwardly into grooves 22 and rest on the ledge formed by narrow strip 21, so that the frame is slidably supported from this ledge by tabs 24. By arranging the positive lens within head 2 in this manner, this lens is well protected, and it is readily accessible on removal of head 2 from body 1.

It will also be understood that the subassembly comprising lens holder 13, lock member 15, cooperating annular flange 12 and its associated plate 11 constitute an eye piece which is slidably received in facing channels 10. This eye piece is releasably secured in position in channels 10 by crimping the ends of these channels as indicated at 16.

While a specific embodiment of the invention has been shown and been described, it will be understood that various alterations may be made without departure from the spirit of the invention as indicated by the appended claims.

What I claim is:

1. The combination with a wide angle periscope for observing the horizon, said periscope comprising an upright body having an optical path therethrough, and cooperating upper and lower relatively wide reflecting members disposed in said optical path, of a magnifying optical system comprising cooperating relatively narrow negative and positive lenses interposed in said optical path, means for supporting the negative lens exteriorly of the upright body and adjacent the lower reflecting member, and means for supporting the positive lens between the reflecting members in proximity to the upper reflecting member.

2. The combination with a wide angle periscope for observing the horizon, said periscope comprising an upright body having an optical path therethrough, and cooperating upper and lower relatively wide reflecting members disposed in said optical path, of a magnifying optical system comprising cooperating relatively narrow negative and positive lenses interposed in said optical path, means for supporting the negative lens exteriorly of the upright body and adjacent the lower reflecting member, and means for supporting the positive lens interiorly of the upright body in proximity to the upper reflecting member.

3. The combination with a wide angle periscope for observing the horizon, said periscope comprising an upright body, a detachable head at the upper end of said body, said body and said head having an optical path therethrough, cooperating upper and lower relatively wide reflecting members disposed in said optical path, and means for supporting said upper reflecting member in said detachable head, of a magnifying optical system comprising relatively narrow cooperating negative and positive lenses disposed in said optical path, means for supporting said negative lens adjacent said lower reflecting member, and means for supporting said positive lens on said detachable head substantially between said body and said detachable head.

4. The combination with a wide angle periscope for observing the horizon, said periscope comprising an upright body, a detachable head at the upper end of said body, said body and said head having an optical path therethrough, cooperating upper and lower relatively wide reflecting members disposed in said optical path, and means for supporting said upper reflecting member in said detachable head, of a magnifying optical system comprising relatively narrow cooperating negative and positive lenses disposed in said optical path, means for supporting said negative lens adjacent said lower reflecting member, a frame for said positive lens, said frame being disposed within said detachable head substantially at the upper end of said body, and a ledge disposed about said frame to provide a support therefor.

5. The combination with a wide angle periscope for observing the horizon, said periscope comprising an upright body, a detachable head at the upper end of said body, said body and said head having an optical path therethrough, cooperating upper and lower relatively wide reflecting members disposed in said optical path, and means for supporting said upper reflecting member in said detachable head, of a magnifying optical system comprising relatively narrow cooperating negative and positive lenses disposed in said optical path, means for supporting said negative lens adjacent said lower reflecting member, a frame for said positive lens, said frame being disposed within said detachable head substantially at the upper end of said body, a ledge disposed about said frame to provide a support therefor, and upwardly and outwardly extending tabs on said frame and resting on said ledge for supporting said positive lens.

6. The combination with a wide angle periscope for observing the horizon, said periscope comprising an upright body, a detachable head at the upper end of said body, said body and said head having an optical path therethrough, cooperating upper and lower relatively wide reflecting members disposed in said optical path, and means for supporting said upper reflecting member in said detachable head, of a magnifying optical system comprising relatively narrow cooperating negative and positive lenses disposed in said optical path, means for supporting said negative lens adjacent said lower reflecting member, a frame for said positive lens, said frame being disposed substantially at the upper end of said body, a ledge disposed about said frame to provide a support therefor, and a depending flange on said frame to facilitate positioning the latter along said ledge.

7. The combination with a wide angle periscope for observing the horizon, said periscope comprising an upright body, a detachable head at the upper end of said body, said body and said head having an optical path therethrough, cooperating upper and lower relatively wide reflecting members disposed in said optical path, and means for supporting said upper reflecting member in said detachable head, of a magnifying optical system comprising relatively narrow cooperating negative and positive lenses disposed in said optical path, means for supporting said negative lens adjacent said lower reflecting member, a frame for said positive lens, said frame being disposed substantially at the upper end of said body and within said detachable head substantially in abutting relation with a portion of the latter, a ledge disposed above said frame and substantially within said detachable head, and upwardly and outwardly extending tabs on said frame and resting on said ledge for supporting said frame substantially in abutment with said portion of said detachable head.

8. The combination with a wide angle periscope for observing the horizon, said periscope comprising an upright body having an optical path therethrough, and cooperating upper and lower relatively wide reflecting members disposed in said optical path, of a magnifying optical system comprising cooperating relatively narrow negative and positive lenses interposed in said optical path, a frame disposed adjacent said lower reflecting member and adjacent the optical path of said magnifying optical system, and means for slidably receiving and supporting said negative lens on said frame.

9. The combination with a wide angle periscope for observing the horizon, said periscope comprising an upright body having an optical path therethrough, and cooperating upper and lower relatively wide reflecting members disposed in said optical path, of a magnifying optical system comprising cooperating relatively narrow negative and positive lenses interposed in said optical path, a frame disposed adjacent said lower reflecting member and adjacent the optical path of said magnifying optical system, an eye piece for said negative lens, and means cooperating with said frame and said eye piece for slidably receiving and supporting the latter.

10. The combination with a wide angle periscope for observing the horizon, said periscope comprising an upright body having an optical path therethrough, and cooperating upper and lower relatively wide reflecting members disposed in said optical path, of a magnifying optical system comprising cooperating relatively narrow negative and positive lenses interposed in said optical path, a frame disposed adjacent said lower reflecting member and adjacent the optical path of said magnifying optical system, an eye piece for said negative lens, means cooperating with said frame and said eye piece for slidably receiving and supporting the latter, and releasable means for securing said eye piece in position.

WILLARD E. SWIFT, Jr.